United States Patent [19]
Nagaya et al.

[11] Patent Number: 5,992,506
[45] Date of Patent: Nov. 30, 1999

[54] AIR CONDITIONING APPARATUS FOR VEHICLE

[75] Inventors: Masakazu Nagaya, Nagoya; Koji Takahashi; Masami Taguchi, both of Kariya, all of Japan

[73] Assignee: Denso Corporation, Kariya, Japan

[21] Appl. No.: 09/039,092

[22] Filed: Mar. 13, 1998

[30] Foreign Application Priority Data

Mar. 13, 1997 [JP] Japan .................................. 9-059270

[51] Int. Cl.⁶ .................................................. B60H 3/00
[52] U.S. Cl. ........................... 165/42; 165/43; 454/121; 454/156
[58] Field of Search ..................... 165/42, 43; 454/121, 454/156

[56] References Cited

U.S. PATENT DOCUMENTS

| | | | |
|---|---|---|---|
| 3,219,103 | 11/1965 | Berry et al. | 165/42 |
| 3,854,525 | 12/1974 | Illg | 165/42 |
| 4,452,301 | 6/1984 | Last et al. | 165/42 |
| 4,834,170 | 5/1989 | Sakurada et al. | 165/43 |
| 5,265,668 | 11/1993 | Fisher | 165/42 |
| 5,711,368 | 1/1998 | Ito et al. | 165/42 |
| 5,755,107 | 5/1998 | Shirota et al. | 165/42 |

FOREIGN PATENT DOCUMENTS

| | | | |
|---|---|---|---|
| 3820-412 | 1/1989 | Germany | 165/42 |
| 56-8711 | 1/1981 | Japan | 165/42 |
| U-59-169212 | 11/1984 | Japan . | |
| 63-312217 | 12/1988 | Japan | 165/42 |
| Y2-3-45847 | 9/1991 | Japan . | |
| 2235976 | 3/1991 | United Kingdom | 165/42 |

*Primary Examiner*—Ira S. Lazarus
*Assistant Examiner*—Terrell McKinnon
*Attorney, Agent, or Firm*—Harness, Dickey & Pierce, PLC

[57] ABSTRACT

An air conditioning apparatus for a vehicle has a first side opening portion and a second side opening portion for blowing air toward right and left sides of a passenger compartment. A cool air passage and a warm air passage are provided adjacently to extend in a vehicle width direction, and the first and second side opening portions are arranged to be perpendicular to the vehicle width direction. A three-way branch duct is attached to the air conditioning apparatus in such a manner that air introduced into the first side opening portion is blown toward a right side of the passenger compartment and air introduced into the second side opening portion is blown toward a left side of the passenger compartment. Thus, a temperature difference between air blown from the right side and air blown from the left side of the passenger compartment can be reduced.

13 Claims, 5 Drawing Sheets

VEHICLE LEFT (WARM AIR PASSAGE SIDE) ←→ VEHICLE RIGHT (COOL AIR PASSAGE SIDE)

AIR CONDITIONING APPARATUS FOR VEHICLE

CROSS-REFERENCE TO RELATED APPLICATION

This application is related to and claims priority from Japanese Patent Application No. Hei. 9-59270 filed on Mar. 13, 1997, the contents of which are hereby incorporated by reference.

BACKGROUND OF THE INVENTION

1. Field of the Invention

The present invention relates to an air conditioning apparatus for a vehicle in which a warm air passage and a cool air passage are adjacently provided to extend in a vehicle width direction, and first and second side opening portions are arranged to be perpendicular to the vehicle width direction.

2. Description of Related Art

A conventional air conditioning apparatus 100 shown in FIG. 7 includes an air conditioning case 101 forming an air passage toward a passenger compartment. Within the air conditioning case 101, an evaporator 102 and a heater core 103 are disposed in parallel in a width direction of a vehicle so that air passes through the evaporator 102 and the heater core 103 in the width direction of the vehicle. Because the heater core 103 is disposed at a downstream air side of the evaporator 102 to cross a part of the air passage, the air passage within the air conditioning case 101 is divided into cool air passage 104 through which cool air bypasses the heater core 103 and a warm air passage 105 through which warm air having passed through the heater core 103 flows. The warm air passage 105 is bent at a downstream air side toward the cool air passage 104. Further, a ratio between an amount of cool air passing through the cool air passage 104 and an amount of warm air passing through the warm air passage 105 is adjusted by an air mixing door 110. In the air conditioning case 101 at a downstream air side of the air passage, there air provided with a face opening portion 107 through which conditioned air is blown toward the upper portion of a passenger in the passenger compartment, a foot opening portion 108 through which conditioned air is blown toward the lower portion of the passenger in the passenger compartment, and a defroster opening portion 109 through which conditioned air is blown toward an inner surface of a windshield.

Further, the face opening portion 107 has a center face opening portion 107a connected to a center face air outlet which is provided at a front center portion in the width direction of the vehicle, and side face opening portions 107b and 107c connected to side face air outlets which is provided at right and left two ends of the passenger compartment. However, in the conventional air conditioning apparatus, warm air flows through the warm air passage 105 as shown by an arrow X, and cool air flows through the cool air passage 104 as shown by arrow Y in FIG. 7. Therefore, cool air readily flows into the side face opening portion 107b, and warm air readily flows into the side face opening portion 107c. As a result, a temperature difference is generated between air blown from the side face opening portion 107b and air blown from the side face opening portion 107c.

SUMMARY OF THE INVENTION

In view of the foregoing problems, it is an object of the present invention to provide an air conditioning apparatus for a vehicle, in which a temperature difference between air blown from one end side and air blown from the other end side in a vehicle width direction can be reduced.

According to the present invention, an air conditioning apparatus includes a branch duct connected to an air conditioning case at a downstream air side of a warm air passage and a cool air passage to form a first side air passage for blowing air toward an upper portion of the passenger compartment from a right side of the passenger compartment and a second side air passage for blowing air toward the upper portion of the passenger compartment from a left side of the passenger compartment. The first side air passage and the second side air passage respectively have first and second opening portions for introducing air within the air conditioning case into the first side air passage and the second side air passage, and first and second opening portions are arranged to be perpendicular to the width direction of the vehicle. Therefore, the arrangement direction of the first and second opening portions is perpendicular to flow directions of cool air in the cool air passage and warm air in the warm air passage. Thus, it can prevent cool air in the cool air passage or warm air in the warm air passage from readily flowing into any one of the first and second opening portions. As a result, a temperature difference between air blown from the first opening portion and air blown from the second opening portion can be reduced.

Further, the branch duct is disposed in such a manner that the first side air passage extends to the right side of the passenger compartment and the second side air passage extends to the left side of the passenger compartment. Therefore, ducts for respectively connecting the first and second side air passages to outlets of the passenger compartment have simple structure. Thus, the ducts readily assembled into the air conditioning apparatus.

Preferably, the branch duct has a partition member for partitioning a center opening portion relative to the first and second opening portions, and the branch duct is disposed in such a manner that the partition member contacts a door member when the door member is controlled to close the center opening portion. Thus, the center opening portion is readily sealed by the door member due to the partition member.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENTS

A preferred embodiment of the present invention will be described hereinafter with reference to the accompanying drawings. In the embodiment, the present invention is applied to a vehicle having a left-side steering wheel.

Figure 1:
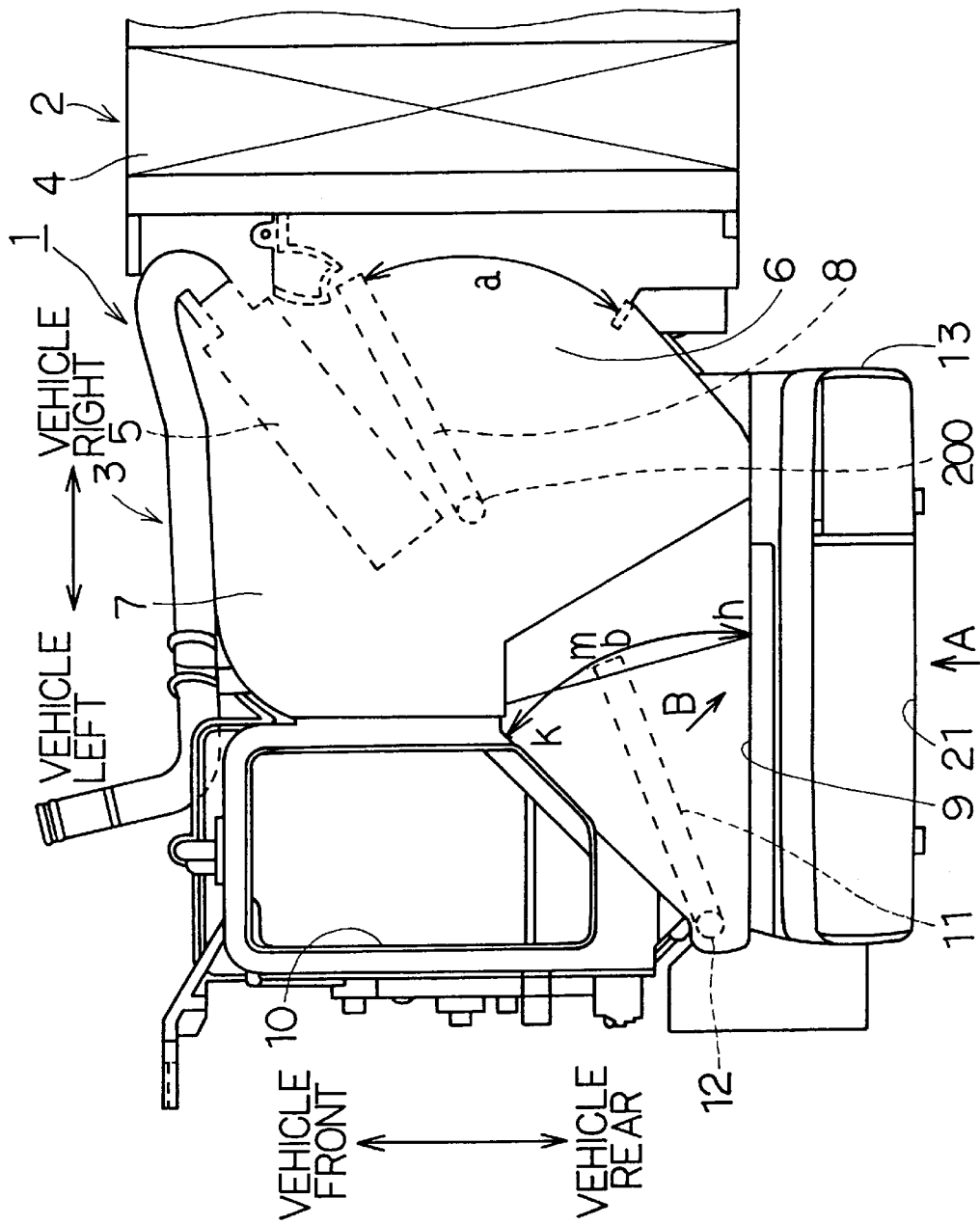
FIG. 1 is a schematic diagram showing an air conditioning apparatus for a vehicle according to a preferred embodiment of the present invention.

As shown in FIG. 1, an air conditioning apparatus 1 includes a blower unit (not shown), a cooling unit 2 and a heating unit 3. The blower unit, the cooling unit 2 and the heating unit 3 are disposed in those order from a right side toward a left side of the vehicle in a right-left direction (i.e., width direction) of the vehicle.

The blower unit has an inside air introduction port and an outside air introduction port at the most upstream air side of the blower unit, and the inside air introduction port and the outside air introduction port are selectively opened and closed by an inside/outside air switching door. In the blower unit, a blower is disposed at a downstream air side of the inside/outside air switching door so that air introduced from the inside air introduction port and the outside air introduction port is blown into the cooling unit 2 and the heating unit 3.

An evaporator 4 (i.e., cooling heat exchanger) is disposed within the cooling unit 2 to cross the whole air passage of the cooling unit 2. The evaporator 4 forms a part of a refrigerant cycle, and the refrigerant cycle includes a compressor, a condenser, the evaporator and the like.

The heating unit 3 heats air having passed through the evaporator 4 to have a predetermined temperature. A heater core 5 (i.e., heating heat exchanger) is disposed within the heating unit 3 to heat air using an engine cooling water as a heat source. Further, the evaporator 4 and the heater core 5 are arranged in the right-left direction of the vehicle as shown in FIG. 1, so that air passes through the evaporator 4 and the heater core 5 in the right-left direction of the vehicle.

As shown in FIG. 1, because the heater core 5 is disposed to cross a part of the air passage within the heating unit 3, a cool air passage 6 through which cool air having passed through the evaporator 4 bypasses the heater core 5 is formed within the heating unit 3. Further, a warm air passage 7 through which warm air having passed through the heater core 5 is formed at a downstream air side of the heater core 5. Therefore, the cool air passage 6 and the warm air passage 7 are provided in parallel in a front-rear direction of the vehicle. That is, the cool air passage 6 and the warm air passage 7 are adjacently arranged to extend in the right-left direction of the vehicle.

The warm air passage 7 is bent toward the cool air passage 6 at a downstream air side of thereof. As shown in FIG. 1, in the heating unit 3, an air mixing door 8 for adjusting a ratio between an amount of cool air flowing through the cool air passage 6 and an amount of warm air flowing through the warm air passage 7 is disposed to be rotated in a range shown by arrow "a" in FIG. 1. By rotating the air mixing door 8, the amount of cool air flowing through the cool air passage 6 and the amount of warm air flowing through the warm air passage 7 are adjusted to control the temperature of air blown into the passenger compartment. In the embodiment, the air mixing door 8 is manually switched by a passenger in the passenger compartment.

At a downstream air side of the air passages 6 and 7 in the heating unit 3, there is provided an air opening portion through which conditioned air is introduced into an air outlet provided in the passenger compartment. Specifically, the air opening portion includes a face opening portion 9 through which conditioned air is blown toward the upper portion of the passenger in the passenger compartment, a foot opening portion (not shown) through which conditioned air is blown toward the lower portion of the passenger in the passenger compartment, and a defroster opening portion 10 through which conditioning air is blown toward an inner surface of a windshield.

A three-way branch duct 13 described later is disposed at a downstream air side of the face opening portion 9. The defroster opening portion 10 is provided in a wall surface at an upper side of the heating unit 3. The foot opening portion is provided in a wall surface at a lower side of the heating unit 3 to be opposite to the defroster opening portion 10. The foot opening portion is opened and closed by a foot door, and the defroster opening portion 10 is opened and closed by a defroster door.

The face opening portion 9 is opened and closed by a face door 11. The face door 11 is rotatably disposed to rotate around a rotary shaft 12 in the heating unit 3. The rotary shaft 12 is disposed in an up-down direction of the vehicle at the most left side of the heating unit 3. The face door 11 can be rotated in a range shown by an arrow "b" in FIG. 1. In the embodiment, the face door 11, the foot door and the defroster door are manually operated by a passenger in the passenger compartment.

Figure 2:
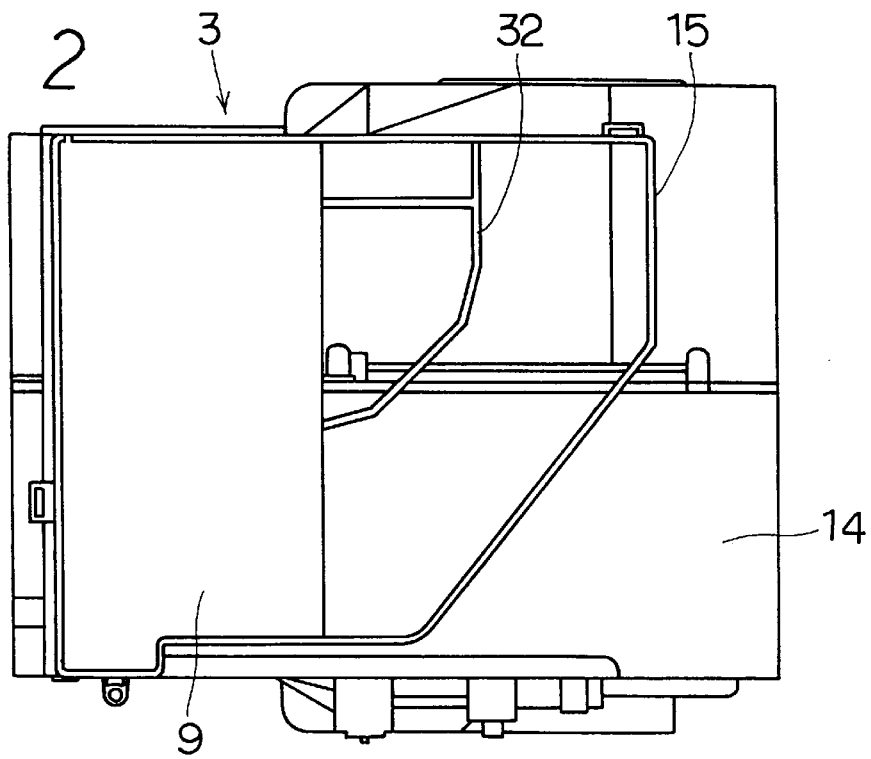
FIG. 2 is a schematic front view showing a heating unit from which a three-way branch duct is detached, when viewed from an arrow A in FIG. 1.

Next, the face opening portion 9 will be now described in detail with reference to FIG. 2. FIG. 2 shows the heating unit 3 in which the three way branch duct 13 is detached from the heating unit 3. As shown in FIG. 2, the face opening portion 9 is opened onto a wall surface 14 of the heating unit at a downstream air side of the air passages 6 and 7 in the heating unit 3. In the embodiment, the face opening portion 9 is formed in an approximate rectangular shape, and is provided at a left side in the wall surface 14.

An attachment portion 15 is formed along a part of the peripheries of the face opening portion 9 to protrude toward the front side (i.e., upper side in FIG. 2) of the vehicle. That is, as shown in FIG. 2, the attachment portion 15 is formed along left, upper and lower peripheries of the face opening portion 9 to extend toward the right side of the vehicle (i.e., the right side in FIG. 2) and to form an approximate pentagonal shape.

Figure 3:
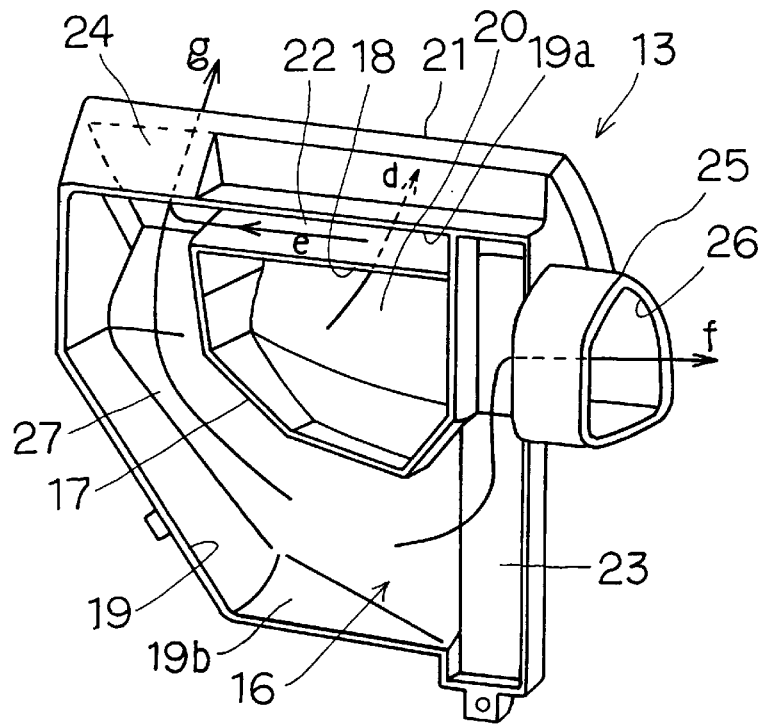
FIG. 3 is a perspective view showing the three-way branch duct when viewed from an arrow B in FIG. 1.

The three-way branch duct 13 is attached in the wall surface 14 of the heating unit to cover the face opening portion 9. Here, the three-way branch duct 13 will be now described with reference to FIGS. 3 and 4. The three-way branch duct 13 is made of resin such as polypropylene, and is formed in an approximate pentagonal shape to correspond to the attachment portion 15 as shown in FIG. 3. The three-way duct 13 is for branching air introduced therein into three flows. The three-way branch duct 13 has an air intake port 16 opened approximately on the same plane at an upstream air side thereof. The air intake port 16 has an approximate pentagonal shape as shown in FIG. 3.

At an approximate center portion in the three-way branch duct 13, a partition portion 17 is formed integrally with the three-way branch duct 13 to partition an interior of the three-way branch portion 13. The partition portion 17 is formed approximately in a hexagonal shape. By the partition portion 17, the interior of the three-way branch duct 13 is partitioned into a center opening portion 18 provided inside the partition portion 17 and a side opening portion 19 provided outside the partition portion 17. Therefore, air blown from the face opening portion 9 is divided into two air flows so that a part of air flows into the center opening portion 18, and a part of air flows into the side opening portion 19. As shown in FIG. 3, in this embodiment, a part of the partition portion 17 extends at a right side in FIG. 3 so that the side opening portion 19 has an air inlet port having an approximate C shape.

Next, an attachment structure for attaching the three-way branch duct 13 into the heating unit 3 will be now described with reference to FIGS. 2 and 3.

The three-way branch duct 13 is attached to the heating unit 3 in such a manner that the air intake port 16 of the three-way branch duct 13 faces to the wall surface 14 of the heating unit 3. The three-way branch duct 13 is fitted to the wall surface 14 of the heating unit 3 using a fastening member such as a vise or a claw installation. That is, the attachment portion 15 protruding from the wall surface 14 of the heating unit 3 is inserted into an opening peripheral portion of the air intake port 16 of the three-way branch duct 13. Specifically, in the embodiment, the attachment portion 15 of the heating unit 3 has a thin top end, and the opening peripheral portion of the air intake port 16 is formed in a groove shape so that the thin top end of the attachment portion 15 is inserted into the groove-shaped opening peripheral portion.

Further, a protrusion portion 32 protruding from the wall surface 14 of the heating unit 3 is formed in the wall surface 14 to be corresponded to the partition portion 17 of the three-way branch duct 13. The protrusion portion 32 has a thin top end, and the partition portion 17 is formed in a groove shape so that the thin top end of the protrusion portion 32 is inserted into the groove-shaped partition portion 17.

Figure 4:
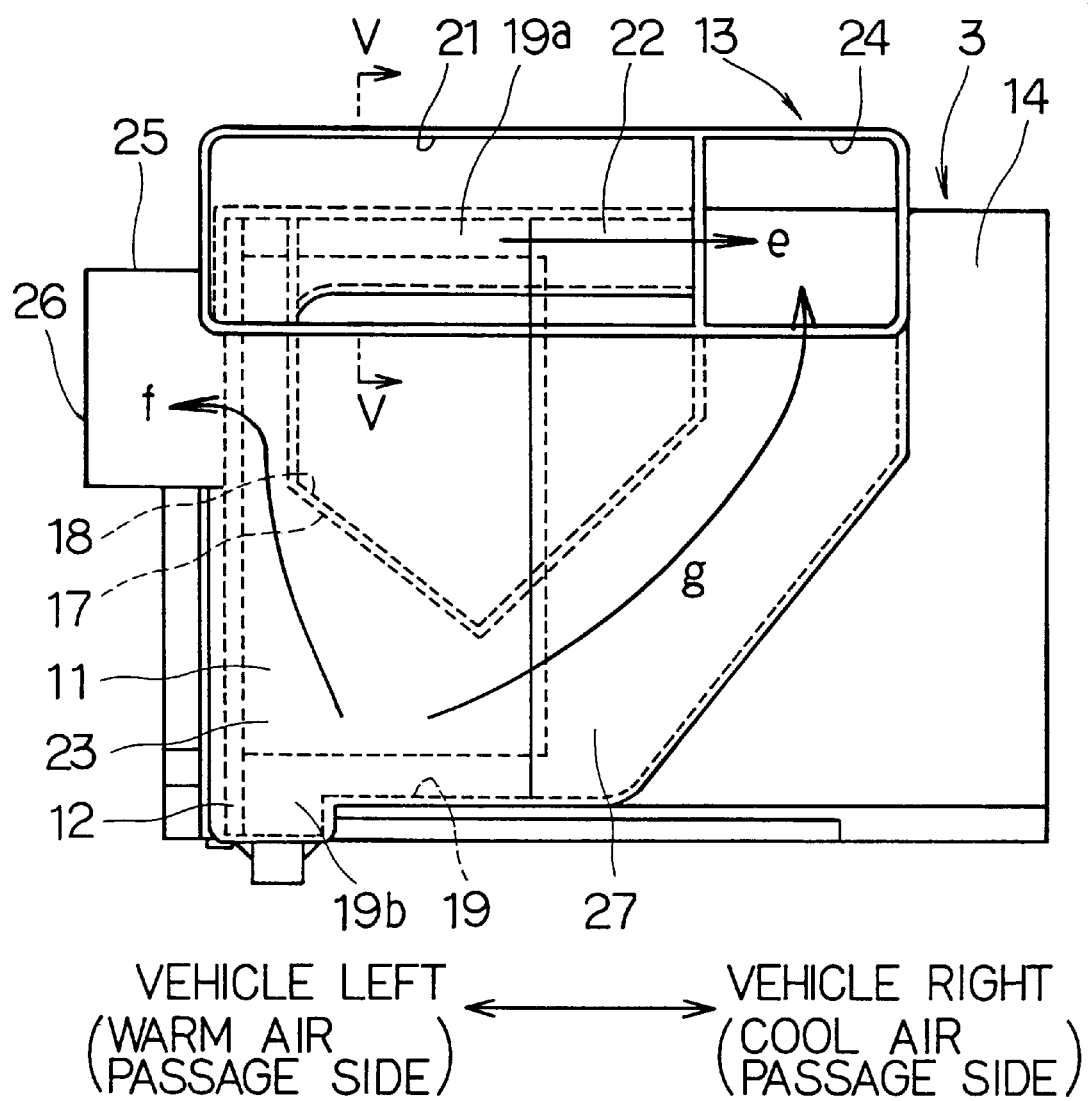
FIG. 4 is a schematic perspective view showing the heating unit and the three-way branch duct when viewed from the arrow A in FIG. 1.

As shown in FIG. 4, in a state where the three-way branch duct 13 is attached to the wall surface 14 of the heating unit 3, the partition portion 17 of the three-way branch duct 13 is engaged with the protrusion portion 32 of the wall surface 14, and a left-side half portion of the partition portion 17 is disposed to be opposite to the face opening portion 9 opened into the wall surface 14. That is, as shown in FIG. 4, right-side half portions of the center opening portion 18 and the side opening portion 19 are closed by the wall surface 14.

Next, air passages within the three-way branch duct 13 will be now described with reference to FIGS. 3 and 4. As shown in FIG. 3, in the three-way branch duct 13, a center air passage 20 is formed by the partition portion 17 so that air introduced from the center opening portion 18 is not mixed into air introduced from the side opening portion 19. The center air passage 20 is formed to extend toward the front side and the upper side of the vehicle as shown an arrow "d" in FIG. 3.

A center air outlet portion 21 is provided in the three-way branch duct 13 at a downstream air side of the center air passage 20, and is formed in an approximate rectangular shape. The center air outlet portion 21 is provided at a center portion in the right-left direction of the vehicle, and is communicated with a center face air outlet (not shown) through which conditioned air is blown toward the upper portion of the passenger in the passenger compartment. That is, through the center air passage 20, conditioned air can be blown toward the upper portion of the passenger in the passenger compartment from a center portion in the passenger compartment in the right-left direction of the vehicle.

On the other hand, because the half portion of the side opening portion 19 is closed by the wall surface 14 as shown in FIG. 4, the side opening portion 19 is partitioned into a first side opening portion 19a placed at an upper side in FIG. 3 and a second side opening portion 19b placed at a lower side in FIG. 3. Therefore, conditioned air introduced from the first side opening portion 19a flows through a first air passage 22 as shown by an arrow "e" in FIGS. 3 and 4, and is blown toward the upper portion of a passenger in the passenger compartment from one end side of the passenger compartment in the right-left direction of the vehicle. The first air passage 22 is formed by inner wall surfaces of the three-way branch duct 13 and the wall surface 14 of the heating unit 3.

A right-side air outlet portion 24 is formed in the three-way branch duct 13 at a downstream air side of the first air passage 22. The right-side air outlet portion 24 is communicated with a right-side face air outlet provided at a right-side end in the passenger compartment in the right-left direction of the vehicle. That is, the right-side air outlet portion 24 is connected to the right-side face air outlet through a duct.

On the other hand, conditioned air introduced from the second side opening portion 19b flows through both second and third air passages 27 and 23 as shown by arrows "g" and "f" in FIGS. 3 and 4. That is, conditioned air flowing through the third air passage 23 is blown toward a left side in the passenger compartment in the right-left direction of the vehicle, and conditioned air flowing through the second air passage 27 is blown toward the right side in the passenger compartment. The third air passage 23 is formed by the inner wall surfaces of the three-way branch duct 13 and a side duct 25 integrated with the three-way branch duct 13. Further, the second air passage 27 is formed by the inner wall surfaces of the three-way branch duct 13 and the wall surface 14 of the heating unit 3. The second air passage 27 is communicated with the right-side air outlet portion 24.

As shown in FIG. 4, a left-side air outlet portion 26 is formed at a downstream air side of the side duct 25. The left-side air outlet portion 26 is communicated with a left-side face air outlet (not shown) provided at a left-side end in the passenger compartment in the right-left direction of the vehicle. That is, the left-side air outlet portion 26 is connected to the left-side face air outlet through a duct.

Air introduced into the right-side air outlet portion 24 has a larger air-flow resistance as compared with air introduced into the left-side air outlet portion 26 as shown in FIG. 4. However, in the embodiment, conditioned air introduced from both of the first side opening portion 19a and second side opening portion 19b flows into the right-side air outlet portion 24. Therefore, it can prevent an amount of air blown from the right-side air outlet portion 24 from being reduced. Thus, the amount of air blown from the right-side air outlet portion 24 is set to be approximately equal to the amount of air blown from the left-side air outlet portion 26.

In the embodiment, the center air outlet portion 21, the right-side air outlet portion 24 and the left-side air outlet portion 26 are provided approximately parallel in the right-left direction (i.e., the width direction) of the vehicle. Further, the center air outlet portion 21 and the right-side air outlet portion 24 are opened toward the rear side of the vehicle, and the left-side air outlet portion 26 is opened toward the left side of the vehicle.

Further, as shown in FIG. 4, a length of the face door 11 in the axial direction of the rotary shaft 12 is set to be smaller than that of the face opening portion 9. Therefore, when the face door 11 is set at a rotational position shown by the arrow "h" in FIG. 1, a part of the first side opening portion 19a and the second side opening portion 19b is opened at two end sides in the axial direction of the face door 11. That is, in the embodiment, conditioned air is always blown from the first and second side opening portions 19a and 19b in any one of the air outlet modes.

Figure 5:
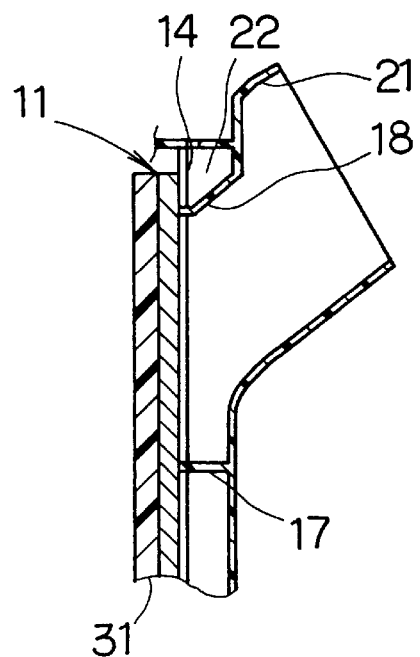
FIG. 5 is a cross-sectional view taken along line V—V in FIG. 4.

Next, a state where the face door 11 closes the center opening portion 18 will be now described with reference to FIGS. 4 and 5. In an air outlet mode exception of a face air outlet mode, the center opening portion 18 is closed by the face door 11. In this case, as shown in FIG. 4, the face door 11 contacts both of an end surface of the partition portion 17 of the center opening portion 18 and an inner wall portion of the inner surface 14 of the heating unit 3.

As shown in FIG. 4, because a part of the center opening portion 18 is placed to be opposite to the wall surface 14 of the heating unit 3, the face door 11 does not contact the whole partition portion 17 of the center opening portion 18. Therefore, in the embodiment, a part of the inner wall portion of the wall surface 14 is used as a seal surface.

Because the face door 11 is formed in a flat shape, the center opening portion 18 is readily closed when the inner wall portion of the wall surface 14 is placed on the same plane as the partition portion 17. In the embodiment, as shown in FIG. 5, a part of the partition portion 17 opposite to the face opening portion 9 protrudes toward the face opening portion 9 as compared with a part of the partition portion 17 opposite to the wall surface 14 of the heating unit 3. Further, a seal member 31 made of resin is attached to the face door 11.

Next, an operation of the embodiment in each air outlet mode will be now described.

(1) FACE AIR OUTLET MODE in the face air outlet mode, the face door 11 is rotated at a position shown by "k" in FIG. 1 to fully open the face opening portion 9. Further, the foot door closes the foot opening portion, and the defroster door closes the defroster opening portion 10. Therefore, the whole air is blown toward the face opening portion 9, and is further blown into the center opening portion 18, the first side opening portion 19a and the second side opening portion 19b in the three-way branch duct 13.

Air blown into the center opening portion 18 flows through the center air passage 20 as shown by the arrow "d" in FIG. 3, and is blown toward the center face air outlet from the center air outlet portion 21. Air blown into the first side opening portion 19a flows through the first air passage 22 as shown by the arrow "e" in FIG. 3, and is blown into the right-side air outlet portion 24. On the other hand, air blown into the second side opening portion 19b flows through both the second and third air passages 27 and 23 as shown by the arrows "g" and "f" in FIG. 3, and is blown into the rightside air outlet portion 24 and the left-side air outlet portion 26.

As shown in FIG. 4, the first side opening portion 19a and the second side opening portion 19b are arranged to be perpendicular to the extending direction (i.e., the right-left direction of the vehicle) of the cool air passage 6 and the warm air passage 7. That is, the arrangement direction of the first side opening portion 19a and the second side opening portion 19b is perpendicular to the flow directions of cool air in the cool air passage 6 and warm air in the warm air passage 7. In the embodiment, because the first side opening portion 19a and the second side opening portion 19b are arranged to be perpendicular to the extending direction (i.e., the right-left direction of the vehicle) of the cool air passage 6 and the warm air passage 7, cool air flowing in the cool air passage 6 and warm air flowing in the warm air passage 7 can be uniformly introduced into both the first and second side opening portions 19a and 19b. As a result, a temperature difference between air blown from the first side opening portion 19a and air blown from the second side opening portion 19b can be reduced.

In the embodiment, the first side opening portion 19a and the second side opening portion 19b are provided in parallel in the up-down direction of the vehicle, and the three-way branch duct 13 is disposed to cover the first and second side opening portions 19a and 19b. Air introduced into the first side opening portion 19a and the second side opening portion 19b flows through the first air passage 22 and the second air passage 27 within the three-way branch duct 13, and is blown toward an upper side of the passenger compartment from the right-side air outlet in the passenger compartment. The right-side air outlet is provided at a right side of the passenger compartment, and is connected to the right-side air outlet portion 24 using a right duct. That is, the right duct extends from a downstream air side of the right-side air outlet portion 24 toward the right-side air outlet of the passenger compartment. On the other hand, a part of air introduced into the second side opening portion 19b flows through the third air passage 23, and is blown toward an upper side of the passenger compartment from the left-side air outlet. The left side air outlet is provided at a left side of the passenger compartment, and is connected to the left-side air outlet portion 26 using a left duct. That is, the left duct extends from a downstream air side of the left-side air outlet portion 26 toward the left-side air outlet of the passenger compartment.

As described above, in the embodiment, because the three air passages 22, 23 and 27 are provided in the three-way branch duct 13, each of the right and left ducts has a simple shape. As a result, the right and left ducts extending from the side air outlet portions 24 and 26 can be readily connected to the side air outlets of the passenger compartment.

(2) BI-LEVEL AIR OUTLET MODE

In the bi-level air outlet mode, the face door 11 is rotated at an intermediate position shown by "m" in FIG. 1 to open the face opening portion 9. Further, the foot door opens the foot opening portion, and the defroster door closes the defroster opening portion 10. Therefore, air is blown toward both of the face opening portion 9 and the foot opening portion. Similarly to the face air outlet mode, air introduced into the face opening portion 9 is blown toward the center opening portion 18, the first side opening portion 19a and the second side opening portion 19b formed in the three-way branch duct 13.

(3) FOOT AIR OUTLET MODE

In the foot air outlet mode, the face door 11 is rotated at a position shown by "h" in FIG. 1 to close the center opening portion 18. Further, the foot door fully opens the foot opening portion, and the defroster door slightly opens the defroster opening portion 10. A large amount of air is blown toward the foot opening portion and a small amount of air is blown toward the defroster opening portion 10. Further, because the face door 11 closes the center opening portion 18 provided in the three-way branch portion 13, air flowing into the face opening portion 9 is blown toward the first side opening portion 19a and the second side opening portion 19b. Further, in the foot air outlet mode, because the face door 11 closes a part of the first side opening portion 19a and a part of second side opening portion 19b, each of the first side opening portion 19a and the second side opening portion 19b is slightly opened. That is, in an air outlet mode exception of the face air outlet mode, each of the first side opening portion 19a and the second side opening portion 19b is opened slightly.

(3) FOOT/DEFROSTER AIR OUTLET MODE

In the foot/defroster air outlet mode, the face door 11 is rotated at a position shown by "h" in FIG. 1 to close the center opening portion 18. Further, the foot door fully opens the foot opening portion, and the defroster door opens the defroster opening portion 10. Similarly to the foot air outlet mode, air is blown toward the first side opening portion 19a and the second side opening portion 19b. The other operations are similar to that in the foot air outlet mode, and the explanation is omitted.

(4) DEFROSTER AIR OUTLET MODE

In the defroster air outlet mode, the face door 11 is rotated at a position shown by "h" in FIG. 1 to close the center opening portion 18. Further, the foot door closes the foot opening portion, and the defroster door fully opens the defroster opening portion 10. Therefore, air is blown toward the defroster opening portion 10. Further, air also is blown toward the first side opening portion 19a and the second side opening portion 19b similarly to the foot air outlet mode.

As described above, in any one of the air outlet mode of the embodiment, the first side opening portion 19a and the second side opening portion 19b are opened. Further, the partition portion 17 is formed in the three-way branch duct 13, and the face door 11 contacts the partition portion 17 to seal the center opening portion 18. That is, the partition portion 17 is used as a seal surface of the face door 11.

Figure 6:
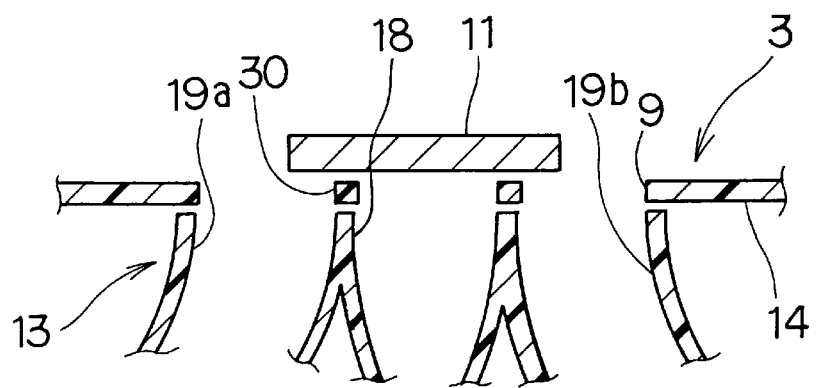
FIG. 6 is a schematic diagram showing a heater core and a three-way branch duct of a comparison example for comparing with the embodiment.
Figure 7:
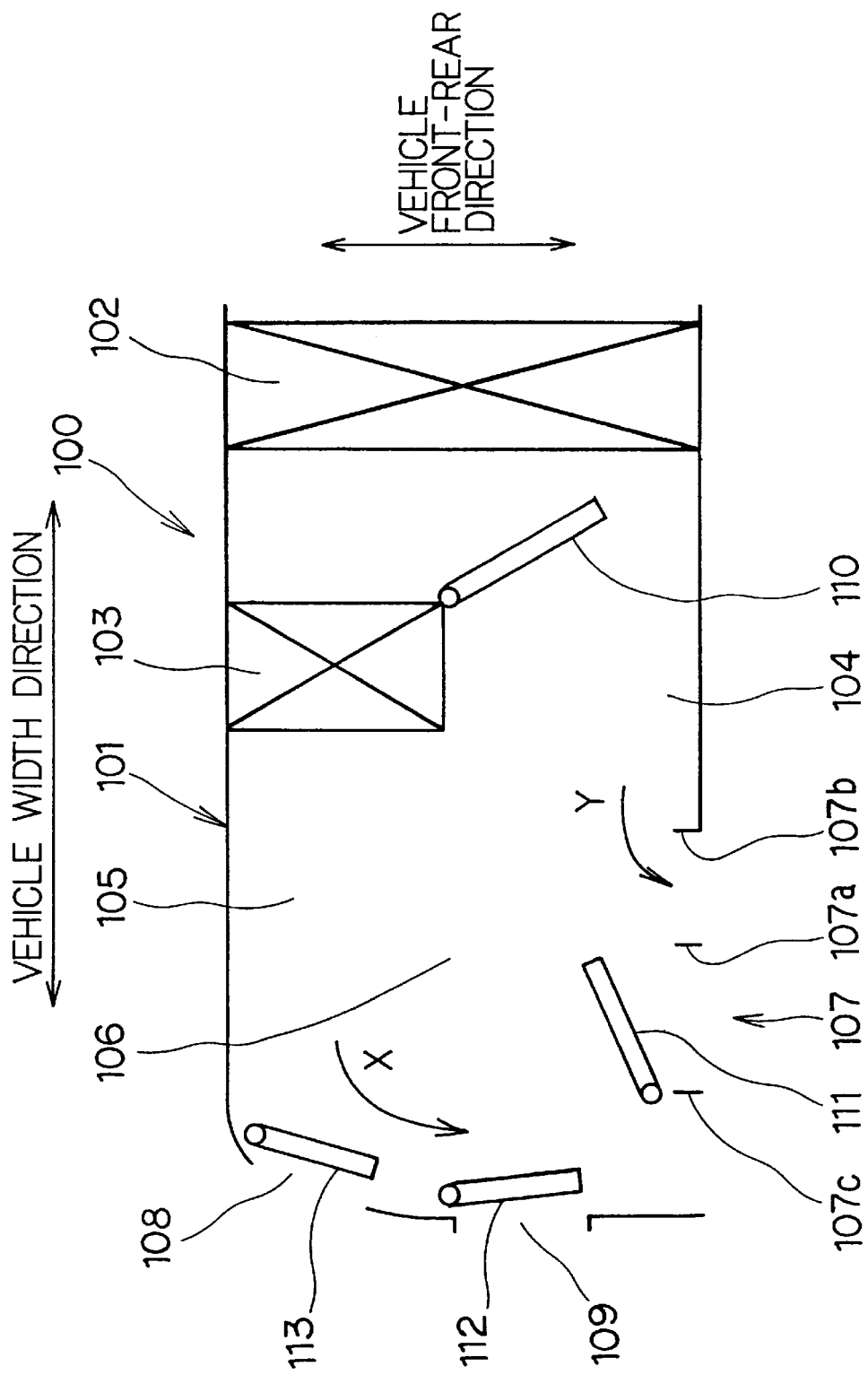
FIG. 7 is a schematic diagram showing a conventional air conditioning apparatus.

FIG. 6 is a schematic diagram showing the heating unit 3 and the three-way branch duct 13 which have a connection structure slightly different from that in the above-described embodiment. In a comparison example shown in FIG. 6, a partition member 30 is provided in the face opening portion 9 opened into the wall surface 14 of the heating unit 3 to close the center opening portion 18 by the face door 11 in an air outlet mode exception the face air outlet mode. That is, the partition member 30 is disposed between the face door 11 and the three-way branch duct 13. However, in this case, a seal member is necessary between the partition member 30 and the three-way branch duct 13 to air-tightly seal the center opening portion 18. Therefore, there are problem to increase assembling step and to deteriorate operation performance.

According to the embodiment, the partition member 30 is not provided in the face opening portion 9, and the partition portion 17 is formed within the three-way branch duct 13. Therefore, the face door 11 readily air-tightly closes the center air passage 20 using the partition portion 17. That is, because the partition portion 17 is used as a seal surface for sealing the center air passage 20, the face door 11 readily air-tightly closes the center air passage 20 when an air outlet mode exception of the face air outlet mode is set.

Although the present invention has been fully described in connection with a preferred embodiment thereof with reference to the accompanying drawings, it is to be noted that various changes and modifications will become apparent to those skilled in the art.

In the above-described embodiment, the first side opening portion 19a and the second side opening portion 19b are provided in the heating unit 3 at a rear side of the vehicle. However, the first and second opening portions 19a and 19b may be provided in the heating unit 3 at an upper side of the vehicle. In this case, the first and second opening portions 19a and 19b are provided in parallel in the right-left direction of the vehicle. Specifically, as shown in FIG. 1, the first and second opening portions 19a and 19b are provided in parallel in the right-left direction of the vehicle at a right side of the rotary shaft 200 of the air mixing door 8. In this case, it is not necessary to bend the warm air passage 7 at the rear side of the vehicle.

Further, the present invention may be applied to an air conditioning apparatus in which the face door 11 closes the center opening portion 18 and the side opening portions 19a and 19b in an air outlet mode exception of the face air outlet mode.

In the above-described embodiment, the first and second opening portions 19a and 19b are provided at two sides of the center opening portion 18; and however, the positions of the opening portions 18, 19a and 19b may be arbitrarily changed.

Such changes and modifications are to be understood as being within the scope of the present invention as defined by the appended claims.

What is claimed is:

1. An air conditioning apparatus for a vehicle having a passenger compartment, said air conditioning apparatus comprising:

an air conditioning case;

a cooling heat exchanger, disposed in said air conditioning case, for cooling air passing therethrough;

a heating heat exchanger, for heating air passing therethrough, disposed in said air conditioning case at a downstream air side of said cooling heat exchanger to form a warm air passage through which air having passed through said heating heat exchanger flows and a cool air passage through which air having passed through said cooling heat exchanger bypasses said heating heat exchanger, said warm air passage and said cool air passage being provided adjacently to extend in a width direction of the vehicle; and a branch duct connected to said air conditioning case at a downstream air side of said warm air passage and said cool air passage to form a first side air passage for blowing air toward an upper portion of the passenger compartment from a right side of the passenger compartment and a second side air passage for blowing air toward the upper portion of the passenger compartment from a left side of the passenger compartment, wherein:

said first side air passage and said second side air passage respectively have first and second opening portions for introducing air within said air conditioning case into said first side air passage and said second side air passage, said first and second opening portions being arranged to be perpendicular to the width direction of the vehicle;

said warm air passage extending in the width direction is bent toward a wall surface of said air conditioning case where said first and second opening portions are provided;

said cool air passage extends to said wall surface on a side of said warm air passage in the width direction; and said branch duct is disposed in such a manner that said first side air passage extends to the right side of the passenger compartment and said second side air passage extends to the left side of the passenger compartment.

2. The air conditioning apparatus according to claim 1, wherein said branch duct has a center air passage for blowing air toward the upper portion of the passenger compartment from an approximate center portion of the passenger compartment in the width direction of the vehicle.

3. The air conditioning apparatus according to claim 2, further comprising:

a door member, disposed in said air conditioning case, for opening and closing said center air passage, wherein said door member is disposed to always open said first side air passage and said second side air passage.

4. The air conditioning apparatus according to claim 3, wherein:

said branch duct has a partition member for partitioning said center air passage relative to said first side air passage and said second side air passage; and said branch duct is disposed in such a manner that said partition member contacts said door member to seal said center air passage when said door member is controlled to close said center air passage.

5. The air conditioning apparatus according to claim 1, wherein:

said air conditioning case has an air opening portion for introducing air into said branch duct, at a downstream air side of said warm air passage and said cool air passage; and said branch duct is connected to said air conditioning case in such a manner that air introduced from said air opening portion of said air conditioning case flows into both said first and second opening portions.

6. An air conditioning apparatus for a vehicle having a passenger compartment, said air conditioning apparatus comprising:

an air conditioning case;

a cooling heat exchanger, disposed in said air conditioning case, for cooling air passing therethrough;

a heating heat exchanger, for heating air passing therethrough, disposed in said air conditioning case at a downstream air side of said cooling heat exchanger to form a warm air passage through which air having passed through said heating heat exchanger flows and a cool air passage through which air having passed through said cooling heat exchanger bypasses said heating heat exchanger, said warm air passage and said cool air passage being arranged to extend in an extend direction; and a branch duct connected to said air conditioning case at a downstream air side of said warm air passage and said cool air passage to form a first side air passage for blowing air toward the passenger compartment from a first side of the passenger compartment and a second side air passage for blowing air toward the passenger compartment from a second side of the passenger compartment, said second side being opposite to said first side in the passenger compartment, wherein:

said first side air passage and said second side air passage respectively have first and second opening portions for introducing air within said air conditioning case into said first side air passage and said second side air passage;

said warm air passage extending in the extending direction is bent toward a wall surface of said air conditioning case, where said first and second opening portions are provided;

said cool air passage extends to said wall surface on a side of said warm air passage in the width direction; and said branch duct is disposed in such a manner that an arrangement of said first and second opening portions is perpendicular to the extending direction of said warm air passage and said cool air passage.

7. The air conditioning apparatus according to claim 6, wherein said branch duct is disposed in such a manner that said first side air passage extends to said first side of the passenger compartment and said second side air passage extends to said second side of the passenger compartment.

8. The air conditioning apparatus according to claim 7, wherein:

said branch duct has a partition member for partitioning a center opening portion relative to said first and second opening portions, said center opening portion being for blowing air toward the passenger compartment from an approximate center between said first side and said second side of the passenger compartment.

9. The air conditioning apparatus according to claim 8, further comprising:

a door member, disposed in said air conditioning case, for opening and closing said center opening portion, wherein said partition member is disposed to contact said door member to air-tightly seal said center opening portion when said door member is controlled to close said center opening portion.

10. An air conditioning apparatus for a vehicle having a passenger compartment, said air conditioning apparatus comprising:

an air conditioning case;

a cooling heat exchanger, disposed in said air conditioning case, for cooling air passing therethrough;

a heating heat exchanger, for heating air passing therethrough, disposed in said air conditioning case at a downstream air side of said cooling heat exchanger to form a warm air passage through which air having passed through said heating heat exchanger flows and a cool air passage through which air having passed through said cooling heat exchanger bypasses said heating heat exchanger, said warm air passage and said cool air passage being provided adjacently to extend in a width direction of the vehicle;

a branch duct connected to said air conditioning case at a downstream air side of said warm air passage and said cool air passage to form a first side air passage for blowing air toward an upper portion of the passenger compartment from a right side of the passenger compartment and a second side air passage for blowing air toward the upper portion of the passenger compartment from a left side of the passenger compartment, said branch duct including a center air passage for blowing air toward the upper portion of the passenger compartment from an approximate center portion of the passenger compartment in the width direction of the vehicle;

a door member, disposed in said air conditioning case for opening and closing said center air passage, wherein said door member is disposed to always open said first side air passage and said second side air passage;

said first side air passage and said second side air passage respectively have first and second opening portions for introducing air within said air conditioning case into said first side air passage and said second side air passage, said first and second opening portions being arranged to be perpendicular to the width direction of the vehicle;

said branch duct is disposed in such a manner that said first side air passage extends to the right side of the passenger compartment and said second side air passage extends to the left side of the passenger compartment;

said branch duct has a partition member for partitioning said center air passage relative to said first side air passage and said second side air passage; and said branch duct is disposed in such a manner that said partition member contacts said door member to seal said center air passage when said door member is controlled to close said center air passage.

11. An air conditioning apparatus for a vehicle having a passenger compartment, said air conditioning apparatus comprising:

an air conditioning case;

a cooling heat exchanger, disposed in said air conditioning case, for cooling air passing therethrough;

a heating heat exchanger, for heating air passing therethrough, disposed in said air conditioning case at a downstream air side of said cooling heat exchanger to form a warm air passage through which air having passed through said heating heat exchanger flows and a cool air passage through which air having passed through said cooling heat exchanger bypasses said hating heat exchanger, said warm air passage and said cool air passage being arranged to extend in an extend direction; and a branch duct connected to said air conditioning case at a downstream air side of said warm air passage and said cool air passage to form a first side air passage for blowing air toward the passenger compartment from a first side of the passenger compartment and a second side air passage for blowing air toward the passenger compartment from a second side of the passenger compartment, said second side being opposite to said first side in the passenger compartment, wherein:

said branch duct is disposed in such a manner that said first side air passage extends to said first side of the passenger compartment and said second side air passage extends to said second side of the passenger compartment;

said first side air passage and said second side air passage respectively have first and second opening portions for introducing air within said air conditioning case into said first side air passage and said second side air passage; and said branch duct is disposed in such a manner that an arrangement of said first and second opening portions is perpendicular to the extending direction of said warm air passage and said cool air passage.

12. The air conditioning apparatus according to claim 11, wherein:

said branch duct has a partition member for partitioning a center opening portion relative to said first and second opening portions, said center opening portion being for blowing air toward the passenger compartment from an approximate center between said first side and said second side of the passenger compartment.

13. The air conditioning apparatus according to claim 12, further comprising:

a door member, disposed in said air conditioning case, for opening and closing said center opening portion, wherein said partition member is disposed to contact said door member to air-tightly seal said center opening portion when said door member is controlled to close said center opening portion.

* * * * *